United States Patent [19]
Perrine

[11] Patent Number: 4,894,945
[45] Date of Patent: Jan. 23, 1990

[54] FISHING LURE

[76] Inventor: Ronald J. Perrine, 8780 Fort Amanda Rd., Spencerville, Ohio 45887

[21] Appl. No.: 244,445
[22] Filed: Sep. 15, 1988
[51] Int. Cl.$^4$ .............................................. A01K 83/00
[52] U.S. Cl. .................................................... 43/42.5
[58] Field of Search ......................................... 43/42.5

[56] References Cited

U.S. PATENT DOCUMENTS

| | | | |
|---|---|---|---|
| 1,464,041 | 7/1923 | Holcomb | 43/42.5 |
| 1,921,657 | 8/1933 | Catarou | 43/42.5 |
| 1,938,653 | 12/1933 | Bardon | 43/42.5 |
| 1,969,944 | 8/1934 | Reinard | 43/42.5 |
| 2,522,725 | 9/1950 | Schiffman | 43/42.5 |
| 2,535,211 | 12/1950 | Jelinek | 43/42.5 |
| 4,139,962 | 2/1979 | Gardyszweski | 43/42.5 |
| 4,475,302 | 10/1984 | Jakeway | 43/42.5 |

Primary Examiner—Kurt Rowan
Attorney, Agent, or Firm—Sughrue, Mion, Zinn, Macpeak & Seas

[57] ABSTRACT

The invention relates to a fishing lure and more particularly to a lure that has a definite dividing region along its longitudinal axis extending centrally along its length, adding to the lure's oscillatory effect. Two concave portions meet about the longitudinal axis, forming the spoon shape. The lure can be adjusted by the fisherman to provide a faster wobble by bending forward its leading edge. Because the lure tapers toward the leading edge and is made from brass, the lure is easily bendable to allow for such adjustment of the wobble action.

11 Claims, 2 Drawing Sheets

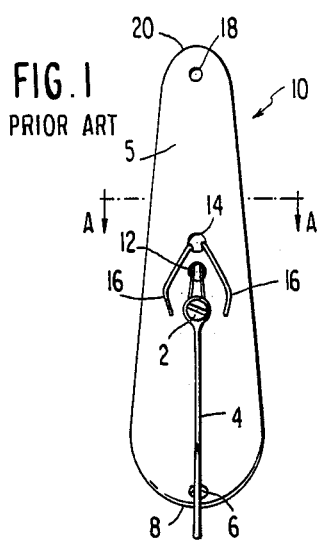
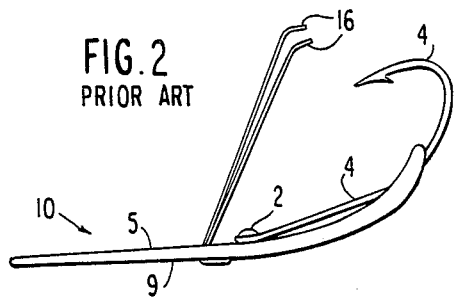
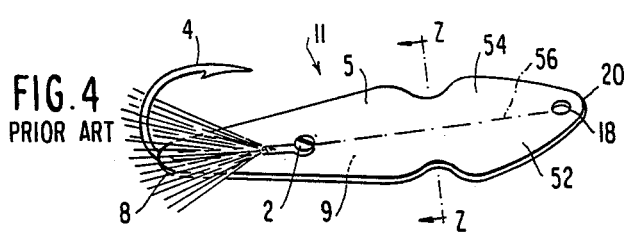
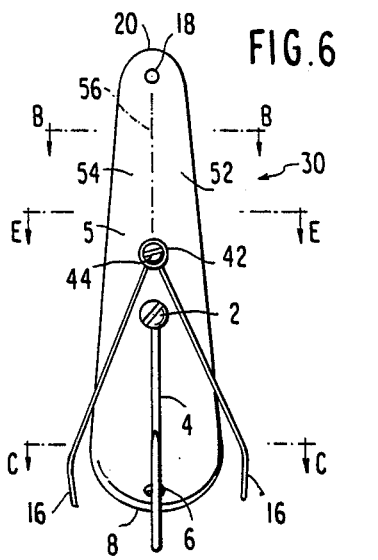
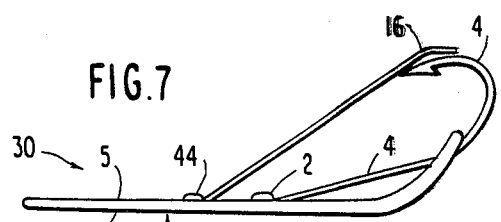
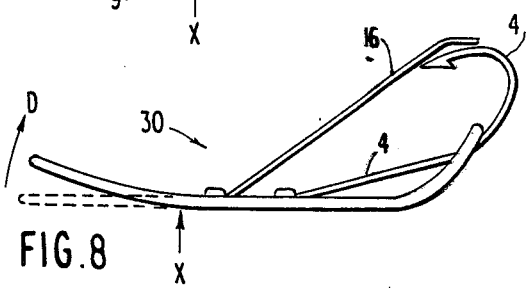
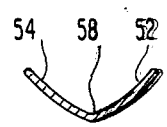

FISHING LURE

BACKGROUND OF THE INVENTION

This invention relates in general to fishing lures of the spoon type and more particularly to a lure that has a longitudinal axis extending centrally along its length which improves the lure action. The invention provides a unique shape and structure that allows for a fisherman to achieve a widely variable degree of wobble action.

Fishing lures are commonly used for attracting game fish to a fish hook. One type of lure is referred to as a spoon lure because of its spoon-like shape. The shape of the spoon causes it to oscillate when pulled by one end through the water, producing light reflection, fluid movement, and noise which simulate the action of a bait fish, thereby attracting game fish to the lure. The fishing hook may be directly mounted on the lure or attached to the trailing edge of the lure. However, spoon-type lures generally are of a rigid metal construction and design that does not allow for a fisherman to adjust the same lure to produce a widely variable oscillatory action. Such adjustment is desirable because certain frequencies of oscillation simulate certain bait fish that can attract specific kinds of fish. Thus, if fish are not biting with a given degree of wobble, the amount of wobble may be adjusted until a setting is selected that produces the desired attraction of fish.

SUMMARY OF THE INVENTION

This invention is directed to a fishing lure that has a spoon body member having rounded leading and trailing edges. The spoon is wider near the trailing edge, and tapers toward the leading edge, so as to and in the stable oscillatory motion. The lure has a definite dividing region along a longitudinal axis extending centrally along its length from a point where a fishing line is connected at the leading edge to the trailing edge of the lure. The dividing region is defined by the intersection of two portions which are slightly concave when viewed from the bottom of the lure. The dividing region may be in the form of a definite dividing line or a definite dividing rounded edge running along the longitudinal axis of the lure. Water impacting the leading edge and directed over the top of the lure or channeled within the concave portions and substantially parallel to its longitudinal axis will thus provide the lure with a regular side-to-side oscillation while it is pulled by the leading edge through the water. The hook shank is aligned with the longitudinal axis and the barbed end extends downward acting as a rudder of sorts, to provide balance and to facilitate such regular motion.

In addition, the forward portion of the present lure can be bent up or down to alter the frequency of the side-to-side oscillation of the lure and, thereby, obtain a desired degree of oscillation.

In particular, the lure can be adjusted by a fisherman to provide the desired degree of wobble by bending forward the leading edge up or down toward the water bed along a transverse axis oriented normal to the longitudinal axis. The greater the bend, the faster the lure oscillates. The lure is made from brass in order to allow for easy bending, yet is strong enough to withstand impact with hard objects. The lure's taper toward the leading edge further makes bending of the spoon easier. Moreover, bending tends to occur at a point along the longitudinal axis nearer the leading edge where extra support of the lure structure, provided from the trailing edge toward the leading edge, discontinues. However, due to the fact that the lure tapers toward the leading edge and the lure is made from a moderately soft metal such as brass, the lure may easily be bent even absent such added structural support. In addition, the thickness of the lure between the top and bottom surface may be varied around the region to be bent to facilitate such bending.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 1 is a top plan view of a prior art fishing lure;

FIG. 2 is a side elevation of a prior art fishing lure of FIG. 1;

FIG. 3 is a cross-sectional view of the fishing lure of FIGS. 1 and 2, taken along the line A—A of FIG. 1;

FIG. 4 is a perspective view of another prior art fishing lure;

FIG. 5 is a cross-sectional view of the fishing lure of FIG. 4, taken along the line Z—Z;

FIG. 6 is a top plan view of a fishing lure embodying the present invention;

FIG. 7 is a side elevation of a fishing lure embodying the present invention, absent the bending of the leading portion of the lure;

FIG. 8 is a side elevation of a fishing lure embodying the present invention, where the leading edge is bent in the direction D;

FIG. 9 is a cross-sectional view of a fishing lure embodying the present invention, taken along the lines B—B of FIG. 6:

FIG. 10 is a cross-sectional view of a fishing lure embodying the present invention, taken along the lines C—C of FIG. 6;

DESCRIPTION OF THE PREFERRED EMBODIMENT

Figure 11:
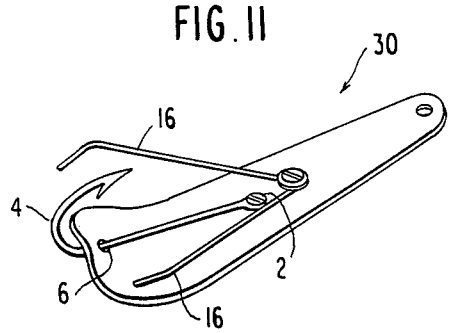
FIG. 11 is a perspective view of a fishing lure embodying the present invention, absent the bending of the leading portion of the lure.
Figure 12:
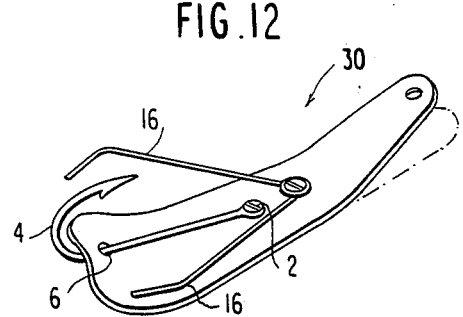
FIG. 12 is a perspective view of a fishing lure embodying the present invention, where the leading edge is bent forward.

Referring now to the accompanying drawings, a combined spoon and hook fishing lure of the prior art is designated generally by the numeral 10. The lure is generally spoon shaped and has leading edge 20, which is the edge at which a line is attached, and a trailing edge 8 which is the furthest edge from the line. As illustrated by FIG. 1, the spoon has a top side 5 and a bottom side 9. The hook 4 is secured to the bottom side 9 by passing the barb end through a hole 6 at the trailing edge 8 of the lure and by securing the eyelet end to the lure body with a screw 2. This design centrally locates the hook shank along a longitudinal axis of the spoon and provides added strength to the structure. Two weed guards 16 are formed by a single wire that is wound around the screw 2, threaded to the bottom portion of the lure through hole 12, and back to the top portion of the lure through hole 14. Hole 18 located at the leading edge 20 is capable of receiving a split ring for attachment of the lure to a fishing line. The lure in cross section defines a continuous curve along the top side 5 and bottom side 9, as is best illustrated by FIG. 3.

FIG. 4 illustrates another combined spoon and hook fishing lure of prior art, designated generally by the numeral 11. The lure 11 also possesses a screw 2 which fastens the eye of the hook 4 to the lure. The lure 11 comprises two symmetrical concave portions 52 and 54 which meet at the longitudinal axis 56 which extends centrally, forming a definite dividing region 58 along that axis, best illustrated by FIG. 5. However, because the lure 11 is thick in construction and possesses a wider leading edge 20 and a narrower trailing edge 8 the lure is not easily bendable in a region near the leading edge.

Conventional spoon-type lures do not allow fishermen to control the frequency of oscillation of the lure and, when the lure is no longer being pulled through the water, it will settle through the water with an uneven motion.

The fishing lure of the present invention is illustrated in FIG. 6 and is designated generally by numeral 30, wherein the same reference numerals of the prior art are used to designate like components. The lure 30 also comprises a screw 2 which fastens the eye of the hook 4 to the lure. The hook is placed through a hole 6 at the trailing edge 8 of the lure for added stability. The lure, when viewed from the bottom side, has a longitudinal axis 56 located centrally and defining two symmetrical halves. It is necessary to align the hook 4 with the longitudinal axis 56 in order to provide balance and permit a regular side-to-side motion of the lure. The lure has a rounded leading edge 20 and its trailing edge 8 also is rounded. Two weed guards 16 are formed by a single wire, placed under and around a washer 42 and secured by a screw 44. Hole 18, located at the leading edge 20, is capable of receiving a split ring for attachment of the lure to a fishing line.

The body of the lure comprises two symmetrical concave portions 52 and 54 which meet at the longitudinal axis 56, thus forming a definite dividing region 58 along that axis. Such a dividing region 58 may form a definite dividing line or a definite dividing rounded edge running along the longitudinal axis 56. Each of the two concave portions 52 and 54 has an identical radius of curvature at corresponding locations along the longitudinal axis. By virtue of this geometry, the oscillatory effect of the lure is increased. The concave portions 52 and 54 each have a radius whose center is not coincident with the other concave portion.

The oscillation effect of the lure may be modified by changing the amount of surface area at the leading edge that is perpendicular to the direction of movement and, in particular, by changing the orientation of the leading edge of the lure. When the lure is in a straight, non-bent configuration, as illustrated in FIG. 7, the lure will produce a given frequency of oscillation. Bending the lure in the direction of arrow D in FIG. 8 allows the user to increase the frequency of the oscillation of the lure while the degree of side to-side wobble remains substantially the same as it was while in the non-bent configuration. The bend may be made between the weed guard attachment screw 44 and the split ring hole 18. Moreover, bending tends to occur along a transverse axis E—E located at point X along the longitudinal axis where extra support of the lure structure, provided by the weed guard screw 44, hook screw 2, and hook 4, discontinues. Because such bending increases the amount of surface area perpendicular to the direction of movement, the resistance of the lure is increased, resulting in an increased frequency of oscillation.

The structure and dynamics of the fishing lure embodying the present invention allow for variable control of the lure's frequency of oscillation as it is pulled through the water. Moreover, that structure permits the lure to continue to oscillate in a regular side-to-side motion when tension on the line is discontinued.

Figure 14A:
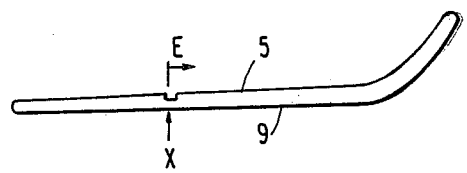
FIGS. 14(A)–14(E) are sectional views showing different variations in the thickness of the lure.
Figure 14B:
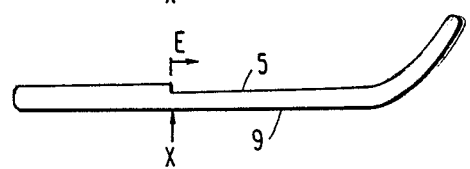
Figure 14C:
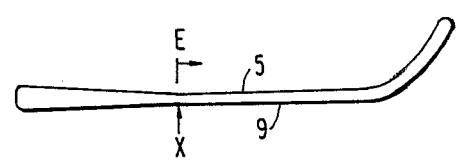
Figure 14D:
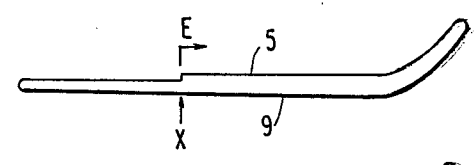
Figure 14E:
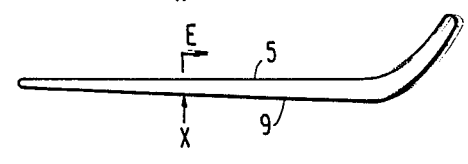

The support structure given by the weed guard screw 44, the hook screw 2, and the hook 4 facilitates bending of the lure along the transverse axis E—E. However, in another embodiment, such added support is not necessary to bend the lure for wobble adjustment. Due to the fact that the lure has a structure that tapers toward the leading edge and the lure is made from brass, the lure may easily be bent along the transverse axis E—E even absent any added structural support. Therefore, the support provided by the hook shank and the two screws is not vital to bending the lure. As such, the hook may be directly mounted to the lure at the trailing edge. In addition, other methods may be used to facilitate the bending of the lure along the transverse axis E—E. For example, in one construction, the thickness of the lure between the top surface 5 and the bottom surface 9 may be smaller along the E—E axis than the thickness of the rest of the spoon, as shown in FIG. 14(A). In another construction, the thickness of the lure between the top surface 5 and the bottom surface 9 from the E—E axis to the leading edge may be thicker than the thickness of the lure from the E—E axis to the trailing edge as shown in FIGS. 14(B) and 14(C). In a further construction, the thickness of the lure between the top surface 5 and the bottom surface 9 may be thicker from the E—E axis to the trailing edge as shown in FIGS. 14(D) and 14(E).

Figure 13:
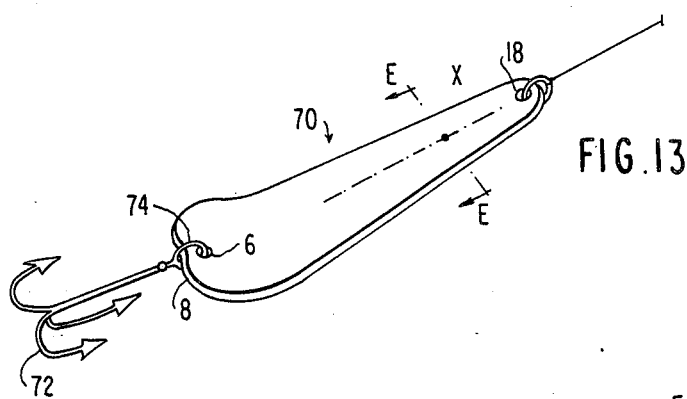
FIG. 13 is a perspective view of an alternate embodiment of the fishing lure, where the hook is attached to the trailing edge of the spoon-shape.

FIG. 13 illustrates an alternate embodiment 70 of the invention where the hook 72 is attached to the trailing edge 8 of the lure by the use of a split ring 4. The lure may be bent at point X on the longitudinal axis along the transverse axis E—E to adjust the frequency of oscillation in the same manner as the combined hook and spoon configuration 30 of the invention where point X corresponds to the same location along the transverse axis.

The invention has been described in detail with particular reference to a preferred embodiment thereof, but it will be understood that variations and modifications can be effected within the spirit and scope of the invention.

What is claimed is:

1. A fishing lure for connection to a fishing line, comprising:
    a spoon-shaped body member having rounded leading and trailing edges and a hook attached thereto;
    said spoon-shaped body member having a definite dividing region along a longitudinal axis extending from said leading to said trailing edge formed by two symmetrical concave portions meeting about said axis; said concave portions extending longitudinally along the entire length of said spoon-shaped body member;
    said concave portions each having a radius whose center is not coincident with the other, said two concave portions formed so that a tangent to either of said two concave portions does not intersect the other of said two concave portions;

wherein said spoon-shaped body member has a wider trailing edge and narrower leading edge, tapering from said trailing edge to said leading edge so that said lure is bendable along an axis substantially perpendicular to said longitudinal axis, said bend being operative to increase the frequency of oscillation of said lure.

2. The invention of claim 1 wherein said hook is aligned along said longitudinal axis.

3. The invention of claim 1 wherein said spoon-shaped body member has extra structural support extending from said trailing edge to a first point between said trailing edge and said leading edge, facilitating the bending of said lure near said first point on said spoon-shaped member.

4. The invention of claim 3 wherein said extra structural support comprises said hook and a means for connecting said hook to a second point located between said leading edge and said trailing edge.

5. The invention of claim 4 wherein said extra structural support further comprises a weed guard screw disposed at said first point.

6. The invention of claim 1 wherein the thickness of the metal forming said spoon-shape in a direction transverse to said longitudinal axis and said perpendicular axis is smaller near said perpendicular axis to facilitate bending along said perpendicular axis.

7. The invention of claim 1 wherein the thickness of the metal forming said spoon-shape in a direction transverse to said longitudinal axis and said perpendicular axis is thicker from said perpendicular axis to said leading edge to facilitate bending along said perpendicular axis.

8. The invention of claim 1 wherein the thickness of the metal forming said spoon-shape in a direction transverse to said longitudinal axis and said perpendicular axis is thicker from said perpendicular axis to said trailing edge to facilitate bending along said perpendicular axis.

9. The invention of claim 1 wherein said bending of said spoon-shaped body member increases the surface area of said spoon that appears perpendicular to the direction of movement, thereby increasing the oscillatory effect of said lure.

10. The invention of claim 1 further comprising a pair of weed guards connected to said spoon-shaped body member by said weed guard screw.

11. A fishing lure for connection to a fishing line, comprising:

a spoon-shaped body member having rounded leading and trailing edges and a longitudinal axis extending from said leading edge to said trailing edge, said member being constructed by a metal material;

said spoon-shaped body member having extra structural support extending along said longitudinal axis from said trailing edge to a first point disposed between said trailing edge and said leading edge, wherein said extra structural support further comprises a hook having a lower end extending through a hole in said spoon-shaped body member at said trailing edge and an upper end attached to said spoon-shaped body member at a second point between a weed guard screw and said trailing edge, said hook being aligned along said axis.

wherein said spoon-shaped body member has a definite dividing region along said axis formed by two symmetrical concave portions meeting about said axis said concave portions extending longitudinally along the entire length of said spoon-shaped body member, said two concave portions being formed so that a tangent to either of said two concave portions does not intersect the other of said two concave portions, and wherein said extra structural support facilitates bending of said lure along a line transverse to said longitudinal axis on a side of said weed guard screw near said leading on said spoon-shaped body member.

* * * * *